(12) United States Patent
Zammit et al.

(10) Patent No.: US 10,956,186 B1
(45) Date of Patent: Mar. 23, 2021

(54) RUNTIME TEXT TRANSLATION FOR VIRTUAL EXECUTION ENVIRONMENTS

(71) Applicant: Parallels International GmbH, Schaffhausen (CH)

(72) Inventors: André Zammit, Sliema (MT); Shawn Roderick Sciberras, Sliema (MT); Liubov Kulakova, Moscow (RU); Nikolay Dobrovolskiy, Moscow (RU); Serguei M. Beloussov, Singapore (SG)

(73) Assignee: Parallels International GmbH, Schaffhausen (CH)

( * ) Notice: Subject to any disclaimer, the term of this patent is extended or adjusted under 35 U.S.C. 154(b) by 231 days.

(21) Appl. No.: 15/695,561

(22) Filed: Sep. 5, 2017

(51) Int. Cl.
 *G06F 9/455* (2018.01)
 *G06F 16/907* (2019.01)
 *G06F 40/47* (2020.01)

(52) U.S. Cl.
 CPC ........ *G06F 9/45537* (2013.01); *G06F 16/907* (2019.01); *G06F 40/47* (2020.01)

(58) Field of Classification Search
 CPC ............... G06F 9/45537; G06F 16/907; G06F 17/2836; G06F 40/47
 See application file for complete search history.

(56) References Cited

U.S. PATENT DOCUMENTS

| | | | | |
|---|---|---|---|---|
| 7,111,231 B1 * | 9/2006 | Huck | .................. | G06F 16/9535 715/205 |
| 9,104,661 B1 * | 8/2015 | Evans | .................... | G06F 40/40 |
| 10,089,132 B2 * | 10/2018 | Hing | ..................... | G06Q 30/04 |
| 10,235,353 B1 * | 3/2019 | Sanders | ................ | G06F 40/211 |
| 10,268,684 B1 * | 4/2019 | Denkowski | ............. | G06F 40/58 |
| 10,679,015 B1 * | 6/2020 | Szarvas | .................. | G06N 20/00 |
| 2004/0133417 A1 * | 7/2004 | Azuma | .................... | G06F 40/55 704/8 |
| 2013/0253901 A1 * | 9/2013 | Krack | ..................... | G06F 40/58 704/2 |

(Continued)

OTHER PUBLICATIONS

"Parallels Remote Application Server", Solutions Guide v15.5, https://www.parallels.com/fileadmin/docs/ras/resources/Parallels-RAS-v15-5-Solutions-Guide.pdf, 43 pages, 1999-2017.

(Continued)

*Primary Examiner* — Benjamin C Wu
(74) *Attorney, Agent, or Firm* — Lowenstein Sandler LLP

(57) ABSTRACT

Systems and methods for runtime text translation for virtual execution environments. An example method comprises: identifying, by a virtualization server application, a window associated with an application running in a virtual execution environment controlled by the virtualization server application; identifying, in metadata associated with the window, a first alphanumeric string to be displayed in the window, the first alphanumeric string comprising one or more words in a first natural language; translating the first alphanumeric string to a second natural language to produce a second alphanumeric string; modifying the metadata associated with the window to produce modified metadata including the second alphanumeric string; transmitting the modified metadata to a virtualization client application associated with the virtual execution environment; and causing the virtualization client application to render the window.

16 Claims, 5 Drawing Sheets

(56) References Cited

U.S. PATENT DOCUMENTS

| | | | |
|---|---|---|---|
| 2014/0208351 A1* | 7/2014 | Moore | H04N 21/4314 725/35 |
| 2014/0372512 A1* | 12/2014 | Clark | H04L 67/42 709/203 |
| 2015/0081269 A1* | 3/2015 | Phadke | G06F 40/58 704/2 |
| 2015/0161113 A1* | 6/2015 | Chin | G06F 40/242 704/2 |
| 2019/0034080 A1* | 1/2019 | Nagel | G06F 40/58 |
| 2020/0043493 A1* | 2/2020 | Ishikawa | G06F 40/42 |

OTHER PUBLICATIONS

"Parallels Remote Appliction Server", Administrator's Guide v15.5 Update 2, https://download.parallels.com/ras/v15.5/docs/en_US/Parallels-RAS-v15-5-Administrators-Guide.pdf, 248 pages, 1999-2017.

"How Parallels Remote Application Server Enhances Microsoft RDS", White Paper, Parallels Remote Application Server, https://www.parallels.com/fileadmin/docs/ras/resources/WP_MaxRemoteDesktopServices_EN_A4.pdf, 11 pages, 2017.

* cited by examiner

US 10,956,186 B1

RUNTIME TEXT TRANSLATION FOR VIRTUAL EXECUTION ENVIRONMENTS

TECHNICAL FIELD

The present disclosure is generally related to virtualized computer systems, and is specifically related to systems and methods for runtime text translation for virtual execution environments.

BACKGROUND

Virtualization may be viewed as abstraction of hardware components into logical objects in order to allow a computer system to execute various software modules, for example, multiple operating systems, concurrently and in isolation from other software modules. Virtualization may be achieved by running a software layer, often referred to as a "virtual machine monitor" or "hypervisor," above the hardware and below the virtual machines. A hypervisor may abstract the physical layer and present this abstraction to virtual machines to use, by providing interfaces between the underlying hardware and virtual devices of virtual machines. For example, processor virtualization may be implemented by the hypervisor scheduling time slots on one or more physical processors for a virtual machine, rather than a virtual machine actually having a dedicated physical processor.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
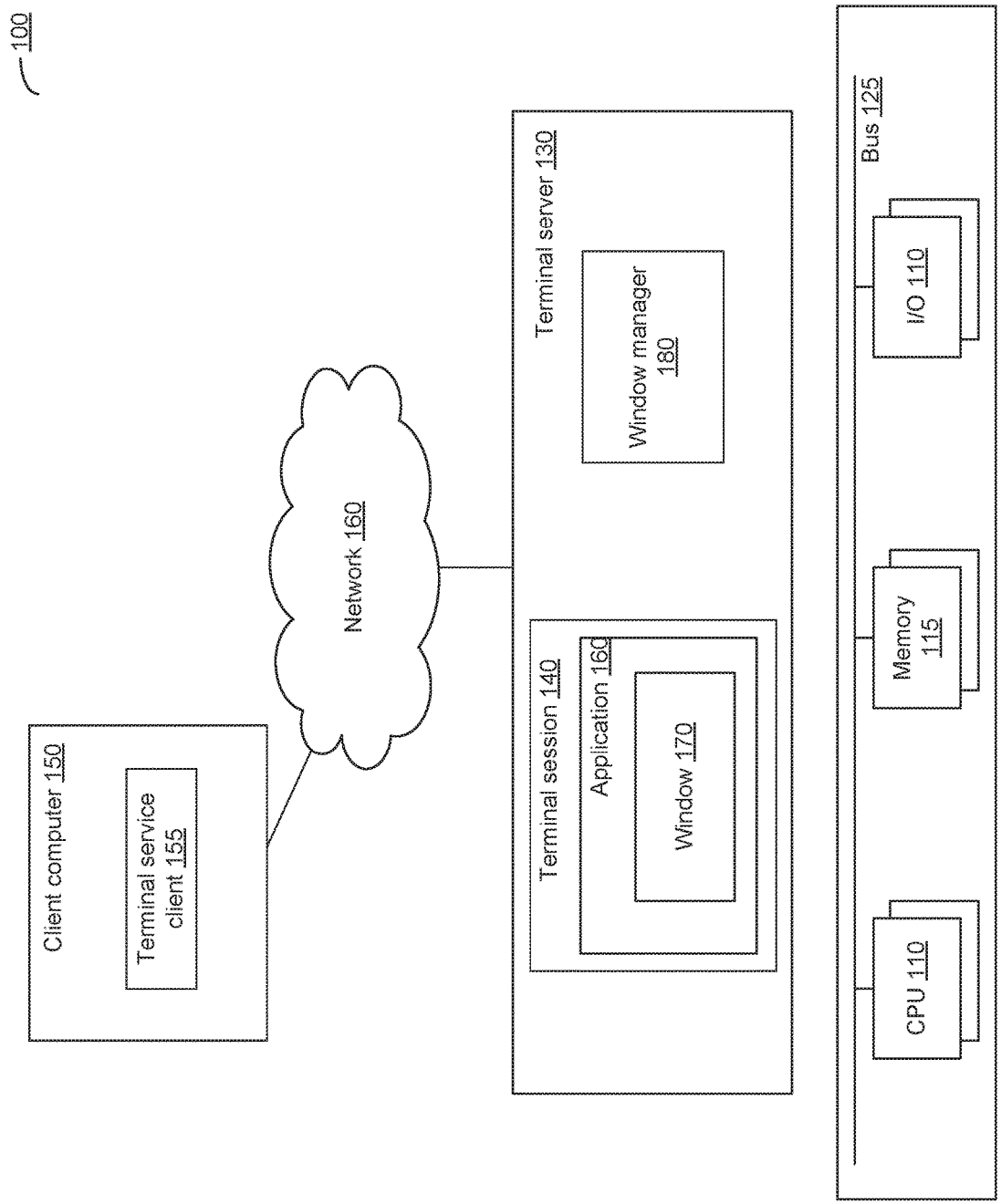
FIG. 1 depicts a high-level diagram of an example computer system implementing a terminal server managing one or more terminal sessions, in which the systems and methods described herein may be implemented.

Described herein are systems and methods for runtime text translation for virtual execution environments. In an illustrative example, a virtual execution environment may be implemented by a terminal session (also referred to as "remote desktop session") running on a multi-user terminal server (also referred to as "remote desktop server") in communication with a terminal service client application running on a client computer. In another illustrative example, a virtual execution environment may be implemented by a virtual machine (VM) running one or more guest applications under a guest operating system (OS) managed by a virtual machine monitor (VMM). The VMM may emulate the underlying hardware platform (e.g., the x86 platform), including emulating the processor, memory, and peripheral devices (such as network interface controllers, hard disk controllers, etc.).

Various software applications (e.g., entertainment, business, and/or communication applications), may fail to provide national language support, thus hindering their utilization by large segments of the user population. The systems and methods of the present disclosure allow on-the-fly (runtime) translation of texts that are being displayed by software applications running within virtual execution environments. Such texts may include alphanumeric strings that are displayed within the graphical user interface (GUI) controls (such as buttons, menus, drop-down lists, etc.), as well as other texts that are displayed within application windows. The target natural language for translating the alphanumeric strings may be chosen to match the language of the user interface of the client device or may be specified by the user.

In an illustrative example, the virtual execution environment may be implemented by a terminal session running on a terminal server in communication with a terminal service client application running on a client computer (e.g., a mobile computing device). A window manager running on the terminal server may iterate over the windows opened by one or more applications running within a user's terminal session. For each window, certain metadata may be identified, including, e.g., definitions of window elements (e.g., window title) and definitions of GUI controls that are displayed within the given window. The identified metadata may include alphanumeric strings (such as alphanumeric strings displayed within buttons, menus, drop-down lists, etc.), which may be presented in the natural language that may be different from the preferred natural language of the client device user. Therefore, the window manager may translate the alphanumeric strings into the target natural language (e.g., the natural language which is currently selected by the user interface of the client device). The translation may be performed, e.g., by looking up a translation cache associated with the terminal server and transmitting a request to a translation service responsive to detecting a cache miss. Responsive to receiving the translated alphanumeric strings, the window manager may modify the respective windows metadata. The modified metadata may then be transmitted to the client device for rendering the windows associated with the application, as described in more detail herein below.

In another illustrative example, the virtual execution environment may be executing code that has been originally developed for other platforms. The virtual execution environment may include one or more virtual machines managed by VMM, each of which may run one or more guest applications under control of the guest operating system. A window manager managed by the VMM may iterate over the windows opened by one or more applications running within a virtual machine. For each window, certain metadata may be identified, including, e.g., definitions of window elements (e.g., window title) and definitions of GUI controls that are displayed within the given window. The identified metadata may include alphanumeric strings (such as alphanumeric strings displayed within buttons, menus, drop-down lists, etc.), which may be presented in the natural language that may be different from the preferred natural language of the user of the client device. Therefore, the window manager may translate the alphanumeric strings into the target natural language (e.g., the natural language which is currently selected by the user interface of the client device). The translation may be performed, e.g., by looking up a translation cache associated with the VMM and transmitting a request to a translation service responsive to detecting a cache miss. Responsive to receiving the translated alphanumeric strings, the window manager may modify the respective windows metadata. The modified metadata may then be transmitted to the virtual machine for rendering the windows associated with the application on the client device, as described in more detail herein below.

In another illustrative example, runtime text translation may be performed by the virtualization client application (e.g., a terminal service client or a virtual machine client application). Responsive to receiving one or more graphical images to be rendered in a window associated with an application running in a virtual execution environment (e.g., a terminal session or a virtual machine), the virtualization client application may perform optical character recognition (OCR) of the images to produce one or more alphanumeric strings to be displayed in the window. The alphanumeric strings may then be translated to the target natural language and utilized for rendering the window.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 depicts a high-level diagram of an example computer system 100 implementing a terminal server managing one or more terminal sessions, in which the systems and methods described herein may be implemented. The computer system 100 may include one or more central processing units (CPUs, also referred to as "processors") 110, which may be communicatively coupled to one or more memory devices 115 and one or more input/output (I/O) devices 110 via a system bus 125.

"Processor" herein refers to a device capable of executing instructions handling data in registers or memory, encoding arithmetic, logical, control flow, floating point or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module. A processor may also be referred to as a central processing unit (CPU). "Memory device" herein refers to a volatile or non-volatile memory, such as RAM, ROM, EEPROM, or any other device capable of storing data. "I/O device" herein refers to a device capable of inputting and/or outputting binary data. In an illustrative example, an I/O device may be provided by a network interface controller (NIC) or a block I/O device, such as a hard disk controller.

In accordance with one or more aspects of the present disclosure, the computer system 100 may implement a terminal server 130 for creating and managing one or more virtual execution environments represented by terminal sessions 140 which run in communication with respective client computer systems 150. Each client computer system 150 may run a terminal service client application 155 that access, e.g., via the Remote Desktop Protocol (RDP) over one or more networks 160, the associated terminal session 140 running on the terminal server 130. Thus, the terminal session 140 provides the processor, memory, and disk resources of the virtual execution environment, while the terminal service client application 155 implements a seamless interface between the terminal session 140 and the display, keyboard, and other I/O devices (e.g., mouse, printers, and/or various USB peripheral devices) of the client computer 150. In an illustrative example, a terminal session 140 may run one or more terminal session applications 160, such as entertainment, business, and/or communication applications.

In certain implementations, the window manager 180 running on the terminal server 130 may iterate over the windows 170 opened by one or more applications 160 running within the terminal session 140. For each window 170, the window manager 180 may identify the respective window metadata including one or more alphanumeric strings, translate the alphanumeric string into the target natural language, and transmit the modified metadata including the translated alphanumeric strings to the client 150 for rendering the windows associated with the application, as described in more detail herein below with reference to FIG. 3.

Alternatively, the runtime text translation may be performed by the terminal service client 155. Responsive to receiving from the terminal server 130 one or more graphical images to be rendered in a window associated with an application running in the terminal session 140, the terminal service client 155 may perform optical character recognition (OCR) of the graphical images to produce one or more alphanumeric strings to be displayed in the window. The terminal service client 155 may then translate the alphanumeric strings to the target natural language and utilized the translated versions of the alphanumeric strings for rendering the window, as described in more detail herein below with reference to FIG. 4.

Figure 2:
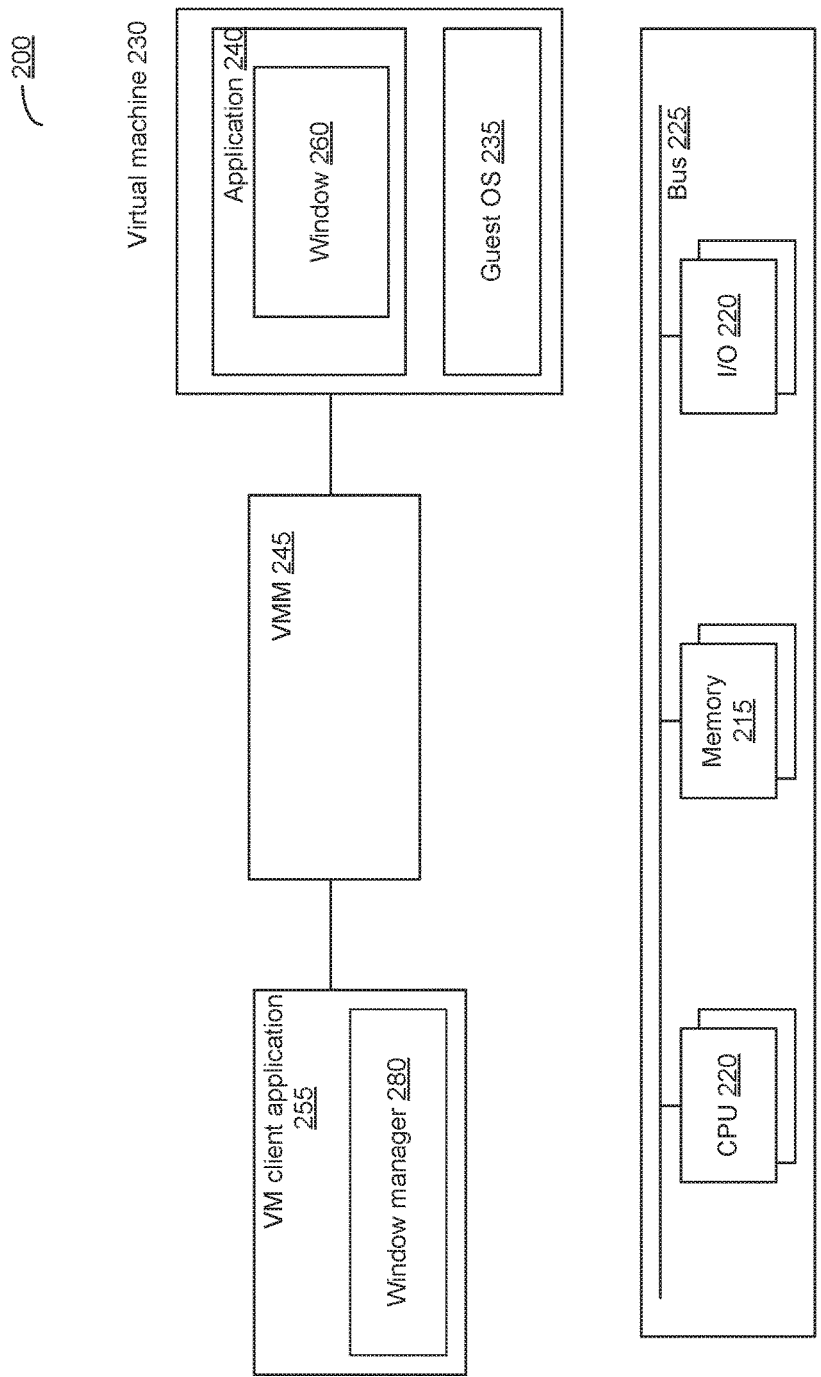
FIG. 2 depicts a high-level diagram of an example computer system 200 running a VMM managing one or more virtual machines in which the systems and methods described herein may be implemented.

FIG. 2 depicts a high-level diagram of an example computer system 200 running a VMM managing one or more virtual machines in which the systems and methods described herein may be implemented. The computer system 200 may include one or more CPUs 220, which may be communicatively coupled to one or more memory devices 215 and one or more input/output (I/O) devices 220 via a system bus 225.

In accordance with one or more aspects of the present disclosure, the computer system 200 may implement a virtual execution environment for executing code that may have been originally developed for other platforms. The virtual execution environment may include one or more virtual machines 230, each of which may run a guest OS 235 managing one or more guest applications 240, such as entertainment, business, and/or communication applications.

Execution of the virtual machine 230 may be facilitated by the VMM 245 that may emulate the underlying hardware platform (e.g., the x86 platform), including emulating the processor, memory, and peripheral devices (e.g., network interface controllers, hard disk controllers, etc.). In certain implementations, the VMM 245 may be executed in a separate privileged context, which is isolated from the kernel context of the host computer system 200. Alternatively, the VMM 245 may be executed in the host kernel context or the host user space context. The VMM 245 may utilize various suitable APIs for privileged-level access to the host platform, including the processor 220, memory 225, and peripheral devices 220 (e.g., network interface controllers, hard disk controllers, etc.).

For improving efficiency and portability of the virtualization architecture, certain virtual machine functions may be performed by one or more instances of the VM client application 255 communicating with the virtual machine 230 via the VMM 245. The VM client application 255 may run in a non-privileged execution mode (e.g., at the current privilege level (CPL) of 3) in the user space of the host computer system 200. The VM client application 255 may utilize various host APIs for accessing host functions, e.g., system calls implementing I/O functions.

In certain implementations, the window manager 180 managed by VMM 245 may iterate over the windows 260 opened by one or more applications 240 running on the virtual machine 230. For each window 260, the window manager 180 may identify the respective window metadata including one or more alphanumeric strings, translate the alphanumeric string into the target natural language, and transmit the modified metadata including the translated alphanumeric strings to the virtual machine 230 for rendering the windows associated with the application, as described in more detail herein below with reference to FIG. 3.

Alternatively, the runtime text translation may be performed by the virtual machine client application 255. Responsive to receiving from the terminal server 130 one or more graphical images to be rendered in a window associated with an application running in the virtual machine 230, the virtual machine client application 255 may perform optical character recognition (OCR) of the graphical images to produce one or more alphanumeric strings to be displayed in the window. The virtual machine client application 255 may then translate the alphanumeric strings to the target natural language and utilized the translated versions of the alphanumeric strings for rendering the window, as described in more detail herein below with reference to FIG. 4.

Figure 3:
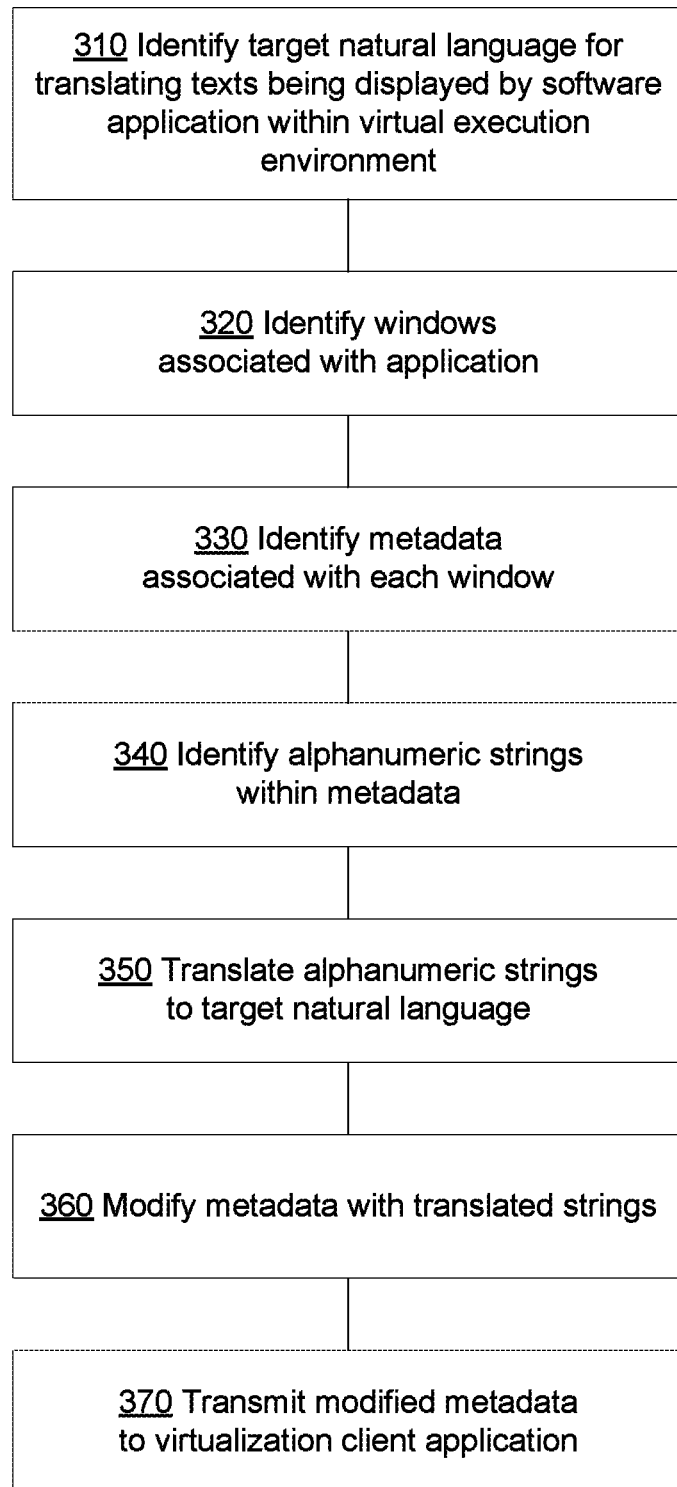
FIG. 3 depicts a flow diagram of an example method of server-side runtime text translation for virtual execution environments, in accordance with one or more aspects of the present disclosure.

FIG. 3 depicts a flow diagram of an example method 300 of server-side runtime text translation for virtual execution environments, in accordance with one or more aspects of the present disclosure. In an illustrative example, a virtual execution environment may be implemented by a terminal session running on a terminal server in communication with a terminal service client application running on a client computer. Therefore, the method 300 and/or each of its individual functions, routines, subroutines, or operations may be performed by the window manager 180 running under the terminal server 130 of FIG. 1.

In another illustrative example, a virtual execution environment may be implemented by a virtual machine running one or more guest applications under a guest OS managed by a VMM. Therefore, the method 300 and/or each of its individual functions, routines, subroutines, or operations may be performed by the window manager 280 managed by the VMM 243 of FIG. 2.

In certain implementations, the method 300 may be performed by a single processing thread. Alternatively, the method 300 may be performed by two or more processing threads, each thread executing one or more individual functions, routines, subroutines, or operations of the method. In an illustrative example, the processing threads implementing the method 300 may be synchronized (e.g., using semaphores, critical sections, and/or other thread synchronization mechanisms). Alternatively, the processing threads implementing method 300 may be executed asynchronously with respect to each other.

At block 310, a window manager executed by a virtualization server application (represented, e.g., by the terminal server 130 of FIG. 1 or the VMM 245 of FIG. 2) may identify the target natural language for translating the texts being displayed by software applications running in a virtual execution environment controlled by the virtualization server application (e.g., the terminal session 140 of FIG. 1 or the virtual machine 230 of FIG. 2). In an illustrative example, the target natural language for translating the application texts may be specified by the virtualization client (e.g., the terminal service client 155 of FIG. 1 or the virtual machine 230 of FIG. 2), e.g., to match the language of the user interface of the client device. In another illustrative example, the target natural language for translating the application texts may be specified by the user of the client device.

At block 320, the window manager may identify one or more windows associated with an application running in the virtual execution environment. In an illustrative example, responsive to detecting a new virtual execution environment having been launched, the window manager may subscribe for notifications of new windows being created within the virtual execution environment. In another illustrative example, the window manager may subscribe for notifications of a window gaining the focus within the virtual execution environment. In yet another illustrative example, the window manager may traverse the list of processes running within the virtual execution environment and identify one or more windows associated with each running process. In yet another illustrative example, responsive to detecting a new application having been launched in the virtual execution environment, the window manager may traverse the list of windows associated with the application.

At block 330, the window manager may identify the metadata associated with each identified window. The metadata may include, e.g., definitions of window elements (e.g., window title) and definitions of GUI controls that are displayed within the given window. In various illustrative examples, the window manager may identify the window metadata by executing certain system calls and/or inspecting system data structures associated with the identified windows.

At block 340, the window manager may identify, within the window metadata, one or more alphanumeric strings to be displayed in the window. Each alphanumeric string may include one or more natural language words.

At block 350, the window manager may translate the identified alphanumeric strings to the target natural language. In an illustrative example, the window manager may look up the alphanumeric strings in a translation cache associated with the virtualization server application. The translation cache may be provided by a data structure comprising a plurality of records, such that each record may map an alphanumeric string comprising one or more natural language words to a translated version of the alphanumeric string and an identifier of the target natural language. Responsive to failing to identify the alphanumeric strings to be translated in the translation cache, the window manager may transmit a translation request to an external translation service. The translation request may include one or more alphanumeric strings to be translated and may identify the target natural language for translation. Responsive to receiving the translation response, the window manager may create, for each translated alphanumeric string, a new record in the translation cache to store a mapping of the alphanumeric string to its translated version and an identifier of the target natural language.

In certain implementations, the window manager may post-process one or more translated alphanumeric strings, e.g., by truncating or otherwise abbreviating one or more words comprised by an alphanumeric string such that the size of the translated version of the alphanumeric string would not exceed the size of the original alphanumeric string.

At block 360, the window manager may modify the window metadata by inserting the translated alphanumeric strings. In an illustrative example, the window manager may replace the original alphanumeric strings with their respective translated versions, so that the translated text would only be displayed within the windows rendered by the virtualization client application (e.g., the terminal service client 155 of FIG. 1 or the virtual machine client application 255 of FIG. 2). In another illustrative example, the window manager may append the translated alphanumeric string to the window metadata, so that the virtualization client application would display both the original and the translated alphanumeric strings.

At block 370, the window manager may transmit the modified metadata to the virtualization client application for rendering the respective windows.

Figure 4:
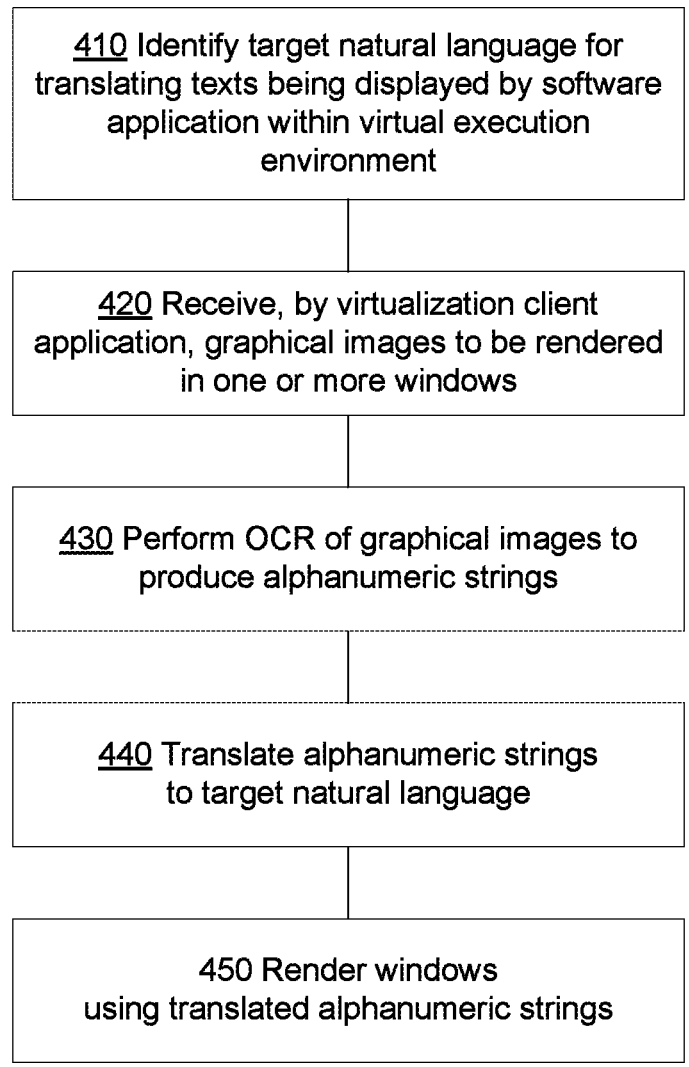
FIG. 4 depicts a flow diagram of an example method of client-side runtime text translation for virtual execution environments, in accordance with one or more aspects of the present disclosure.

FIG. 4 depicts a flow diagram of an example method 400 of client-side runtime text translation for virtual execution environments, in accordance with one or more aspects of the present disclosure. In an illustrative example, a virtual execution environment may be implemented by a terminal session running on a terminal server in communication with a terminal service client application running on a client computer. Therefore, the method 400 and/or each of its individual functions, routines, subroutines, or operations may be performed by the terminal service client 155 in communication with terminal server 140 of FIG. 1.

In another illustrative example, a virtual execution environment may be implemented by a virtual machine running one or more guest applications under a guest OS managed by a VMM. Therefore, the method 400 and/or each of its individual functions, routines, subroutines, or operations may be performed by the virtual machine client application 255 in communication with VMM 245 of FIG. 2.

In certain implementations, the method 400 may be performed by a single processing thread. Alternatively, the method 400 may be performed by two or more processing threads, each thread executing one or more individual functions, routines, subroutines, or operations of the method. In an illustrative example, the processing threads implementing the method 400 may be synchronized (e.g., using semaphores, critical sections, and/or other thread synchronization mechanisms). Alternatively, the processing threads implementing method 400 may be executed asynchronously with respect to each other.

At block 410, the virtualization client application implementing the method may identify the target natural language for translating the texts being displayed by software applications. In an illustrative example, the target natural language for translating the application texts may be selected to match the language of the user interface of the client device. In another illustrative example, the target natural language for translating the application texts may be specified by the user of the client device.

At block 420, the virtualization client application may receive one or more graphical images to be rendered in one or more windows associated with an application running in a virtual execution environment managed by a virtualization server application. In an illustrative example, responsive to detecting a new application having been launched in the virtual execution environment, the virtualization client application may traverse the list of windows associated with the application and identify graphical images to be rendered within the respective windows.

At block 430, the virtualization client application may perform an optical character recognition of at least part of each graphical image, thus producing one or more alphanumeric strings corresponding to the respective graphical images. Each alphanumeric string may include one or more natural language words.

At block 440, the virtualization client application may translate each alphanumeric string to the target natural language. In an illustrative example, the virtualization client application may look up each alphanumeric string in a translation cache. The translation cache may be provided by a data structure comprising a plurality of records, such that each record may map an alphanumeric string comprising one or more natural language words to a translated version of the alphanumeric string and an identifier of the target natural language. Responsive to failing to identify the alphanumeric strings to be translated in the translation cache, the virtualization client application may transmit a translation request to an external translation service. The translation request may include one or more alphanumeric strings to be translated and may identify the target natural language for translation. Responsive to receiving the translation response, the virtualization client application may create, for each translated alphanumeric string, a new record in the translation cache to store a mapping of the alphanumeric string to its translated version and an identifier of the target natural language. In certain implementations, the virtualization client application may post-process one or more translated alphanumeric strings, e.g., by truncating or otherwise abbreviating one or more words comprised by an alphanumeric string such that the size of the translated version of the alphanumeric string would not exceed the size of the original alphanumeric string.

At block 450, the virtualization client application may render the window comprising the translated alphanumeric strings. In an illustrative example, the original alphanumeric strings may be replaced with their respective translated versions, so that the translated text would only be displayed within the windows rendered by the virtualization client application. In another illustrative example, the virtualization client application may display both the original and the translated alphanumeric strings.

Figure 5:
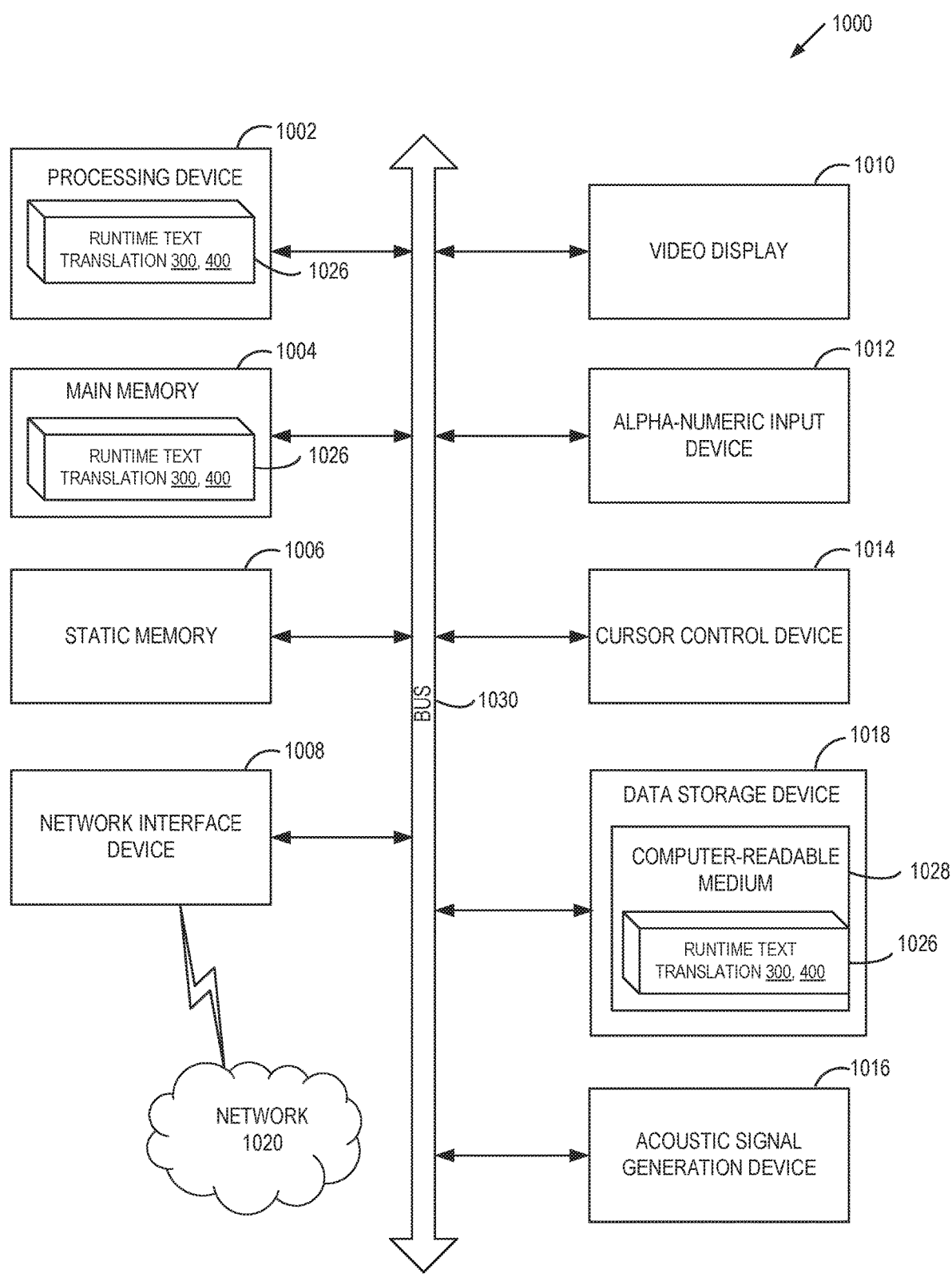
FIG. 5 depicts a block diagram of an example computer system operating in accordance with one or more aspects of the present disclosure.

FIG. 5 schematically illustrates a component diagram of an example computer system 1000 which may perform any one or more of the methods described herein. In various illustrative examples, the computer system 1000 may represent the example computer system 100 of FIG. 1 or example computer system 200 of FIG. 2.

The example computer system 1000 may be connected to other computer systems in a LAN, an intranet, an extranet, and/or the Internet. The computer system 1000 may operate in the capacity of a server in a client-server network environment. The computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

The computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, the processing device 1002 may be configured to execute instructions implementing the methods 300, 400 for runtime text translation for virtual execution environments.

The computer system 1000 may further comprise a network interface device 1008, which may be communicatively coupled to a network 1020. The computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

The data storage device 1018 may include a computer-readable storage medium (or more specifically a non-transitory computer-readable storage medium) 1028 on which is stored one or more sets of executable instructions 1026. In accordance with one or more aspects of the present disclosure, the executable instructions 1026 may comprise executable instructions encoding various functions of methods 300, 400 for runtime text translation for virtual execution environments.

The executable instructions 1026 may also reside, completely or at least partially, within the main memory 1004 and/or within the processing device 1002 during execution thereof by the computer system 1000, the main memory 1004 and the processing device 1002 also constituting computer-readable storage media. The executable instructions 1026 may further be transmitted or received over a network via the network interface device 1008.

While the computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   determining, by a virtualization server application running in a privileged execution mode, that an application window has gained focus in a virtual execution environment controlled by the virtualization server application via a virtualization client application running in a non-privileged execution mode;
   identifying, in metadata associated with the application window, a first alphanumeric string to be displayed in the application window, the first alphanumeric string comprising one or more words in a first natural language;
   translating the first alphanumeric string to a second natural language to produce a second alphanumeric string;
   modifying the metadata associated with the application window to produce modified metadata including the second alphanumeric string;
   transmitting, by the virtualization server application, the modified metadata to the virtualization client application; and
   causing the virtualization client application to render, using the modified metadata, the application window in the virtual execution environment.

2. The method of claim 1, wherein the virtualization server application is provided by one of: a virtual machine manager or a terminal server.

3. The method of claim 1, wherein the virtual execution environment is provided by one of: a virtual machine or a terminal session.

4. The method of claim 1, wherein the virtualization client application is provided by one of: a virtual machine client application or a terminal service client application.

5. The method of claim 1, further comprising:
   receiving, from the virtualization client application, an identifier of the second natural language.

6. The method of claim 1, wherein translating the first alphanumeric string further comprises:
   looking up at least part of the first alphanumeric string in a translation cache associated with the virtualization server application.

7. The method of claim 6, wherein translating the first alphanumeric string further comprises:
   responsive to failing to find the part of the first alphanumeric string in the translation cache, transmitting a translation request to a translation service.

8. The method of claim 1, wherein modifying the metadata further comprises:
   replacing, in the metadata, the first alphanumeric string with the second alphanumeric string.

9. The method of claim 1, wherein modifying the metadata further comprises:
   appending the second alphanumeric string to the metadata.

10. A non-transitory computer-readable storage medium comprising executable instructions that, when executed by a computer system, cause the computer system to:
    determine, by a virtualization server application running in a privileged execution mode, that an application window has been created in a virtual execution environment controlled by the virtualization server application via a virtualization client application running in a non-privileged execution mode;
    identify, in metadata associated with the application window, a first alphanumeric string to be displayed in the application window, the first alphanumeric string comprising one or more words in a first natural language;
    translate the first alphanumeric string to a second natural language to produce a second alphanumeric string;
    modify the metadata associated with the application window to produce modified metadata including the second alphanumeric string; and
    transmit, by the virtualization server application, the modified metadata to the virtualization client application; and
    causing the virtualization client application to render, using the modified metadata, the application window in the virtual execution environment.

11. The non-transitory computer-readable storage medium of claim 10, wherein the virtualization server application is provided by one of: a virtual machine manager or a terminal server.

12. The non-transitory computer-readable storage medium of claim 10, wherein the virtual execution environment is provided by one of: a virtual machine or a terminal session.

13. The non-transitory computer-readable storage medium of claim 10, wherein the virtualization client application is provided by one of: a virtual machine client application or a terminal service client application.

14. The non-transitory computer-readable storage medium of claim 10, wherein translating the first alphanumeric string further comprises:
    looking up at least part of the first alphanumeric string in a translation cache associated with the virtualization server application.

15. The non-transitory computer-readable storage medium of claim 10, wherein modifying the metadata further comprises:
    replacing, in the metadata, the first alphanumeric string with the second alphanumeric string.

16. The non-transitory computer-readable storage medium of claim 10, wherein modifying the metadata further comprises:
    appending the second alphanumeric string to the metadata.

* * * * *